United States Patent Office 2,938,038
Patented May 24, 1960

2,938,038
2-(3,4-DIHYDROXYPHENYLAMINO)-IMIDAZOLINE HYDROCHLORIDE AND PROCESS

Rudolf Wilhelm Hirt, Muri, near Bern, Switzerland, assignor, by mesne assignments, to The Wander Company, Chicago, Ill., a corporation of Delaware No Drawing. Filed Dec. 17, 1956, Ser. No. 628,566

Claims priority, application Switzerland Dec. 19, 1955

10 Claims. (Cl. 260—309.6)

This invention relates to new compounds which have valuable pharmacological properties and which may be used particularly as vasoconstrictors.

More specifically, the invention relates to a group of 2-arylamino-imidazoline compounds of the type

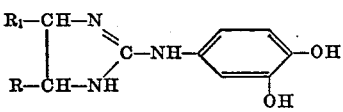

wherein R and $R_1$ may be hydrogen, or an aliphatic, aromatic, or heterocyclic group. In particular, the invention relates to 2-(3,4-dihydroxyphenylamino)-imidazoline wherein both R and $R_1$ are hydrogen as in the following formula

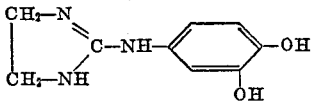

The compounds of the present invention may be obtained by condensing 4-amino-pyrocatechol with an ethylene-isothio-urea-alkyl ether of the formula

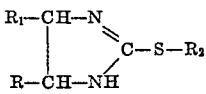

wherein R and $R_1$ may be hydrogen, or an aliphatic, aromatic, or heterocyclic group, and $R_2$ is an alkyl group. Preferably, $R_2$ in the foregoing formula should be a lower alkyl group such as methyl, ethyl, propyl, or butyl. During the condensation reaction a mercaptan of the formula $R_2$—S—H is split off as illustrated in the following equation:

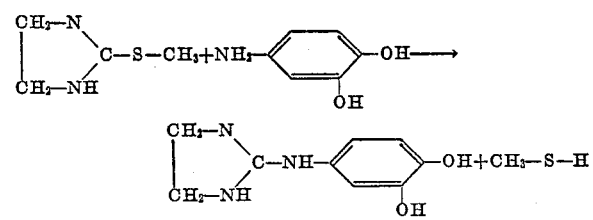

The above condensation is effected, in accordance with the present invention, by heating a salt of the ethylene-isothio-urea-alkyl ether with a derivative of 4-amino-pyrocatechol having masked hydroxy groups. The ether salts which may be used include the hydrogen halide salts, particularly the hydroiodide, and the dimethyl sulfate salt. The derivative of 4-amino-pyrocatechol is preferably the acetone compound thereof, but it is also within the scope of the invention to utilize a dialkyl ether or a bis-O-acyl derivative of 4-amino-pyrocatechol. The reactants are heated together at a temperature just sufficient to cause splitting off of mercaptan, generally from about 100° C. to about 150° C., and the heating is continued until the evolution of mercaptan has substantially ceased. Although not essential, it is preferred that the condensation reaction be carried out in the presence of a suitable inert solvent or reaction medium. The heterocyclic nitrogen bases such as pyridine and picoline, or other homologs of pyridine, are particularly desirable.

After the reaction has subsided, the reaction mixture may be introduced into aqueous sodium hydroxide and the desired reaction product is separated either by filtration or by extraction with a suitable solvent. In some instances, the product may be distilled under vacuum and in other instances purification by crystallization is necessary. At this point, the separated product is a derivative, such as the acetone compound, of the desired 2-(3,4-dihydroxyphenylamino)-imidazoline and has masked hydroxy groups, but these masked hydroxy groups can readily be liberated by treatment of the reaction product with an inorganic acid to obtain a stable acid salt of the base.

The following example is illustrative of the process:

Example 122 parts of ethylene-isothio-urea-methyl ether hydroiodide and 79 parts of 4-amino-pyrocatechol-acetone compound of the formula

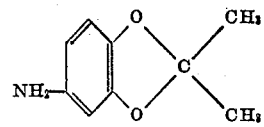

are mixed with 100 parts of absolute pyridine and heated in an oil bath to 110° C. with reflux condensation. After a short time, vigorous development of methyl mercaptan takes place which escapes in the form of a gas. After the main reaction has subsided, the mixture is heated to 125° C. for another 3 hours, and then the pyridine is sucked off with vacuum. Subsequently, the mixture is dissolved in a small amount of water and introduced into concentrated sodium hydroxide. This results in the separation of a rapidly solidifying oil. The solidified product is collected on a suction filter, washed with water, and dried in the vacuum, and finally it is distilled in the vacuum, $B.P._{0.1}$ 180° C. to 185° C. The distillate is dissolved in benzene, cooled, mixed with petroleum ether, and then cooled down once more. This results in separation of the pure acetone compound of 2-(3,4-dihydroxyphenylamino)-imidazoline, M.P. 172° C. to 173° C.

The acetone compound may then be transformed into the free dihydroxy compound by dissolving it in an adequate amount of concentrated hydrochloric acid (36 to 38%), allowing to stand over night, then cooling in ice-water, collecting the precipitated product on a suction filter, and washing it with a small amount of alcoholic hydrochloric acid, and finally washing several times with ether. When recrystallizing the resulting 2-(3,4-dihydroxyphenylamino)-imidazoline hydrochloride from absolute alcohol while cooling down to —30° C., colorless crystals are obtained which melt at 197° C. to 198° C.

As heretofore briefly mentioned, 2-(3,4-dihydroxyphenylamino)-imidazoline of the formula

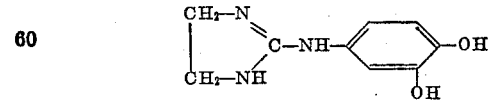

has pronounced vasoconstrictive activity and shows an effect on blood pressure which compares very favorably with the effect of epinephrine (Adrenalin) but at the same time causes no increase in pulse rate as do epinephrine and its derivatives. Moreover, the imidazoline compound of the present invention is many times less toxic than epinephrine and may, therefore, be used to good advantage for decongesting the mucous membranes and as a useful adjunct to local anesthetics. The decongesting effect of the compound is evident both in solution and in aerosol form. For example, a solution of the compound in an isotonic liquid provides a nose drop preparation which is highly effective in relieving nasal congestion. Although the compound as such has no anesthetizing effects, it is found that infiltration anesthesia is prolonged by the addition of the imidazoline compound to a local infiltration anesthetic, e.g. procaine or the like.

I claim:

1. 2-(3,4-dihydroxyphenylamino)-imidazoline hydrochloride.

2. A process for the production of 2-(3,4-dihydroxyphenylamino)-imidazoline hydrochloride which comprises reacting a derivative of 4-amino-pyrocatechol having masked hydroxy groups with a salt of an ethylene-isothio-urea-alkyl ether of the formula

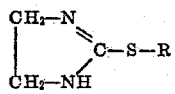

wherein R is an alkyl group, at a temperature sufficient to effect splitting off of a mercaptan of the formula R—S—H, separating from the reaction mixture a compound of 2-(3,4-dihydroxyphenylamino)-imidazoline having masked hydroxy groups, treating the latter with hydrochloric acid and recovering 2-(3,4-dihydroxyphenylamino)-imidazoline hydrochloride.

3. The process of claim 2 further characterized in that said derivative is selected from the group consisting of the acetone compound, a dialkyl ether, and a bis-O-acyl compound of 4-amino-pyrocatechol.

4. The process of claim 2 further characterized in that said salt of ethylene-isothio-urea-alkyl ether comprises a hydrogen halide salt.

5. The process of claim 2 further characterized in that R is a lower alkyl group.

6. The process of claim 2 further characterized in that the reaction is carried out at a temperature of from about 100° C. to about 150° C.

7. The process of claim 2 further characterized in that the reaction is carried out in the presence of an inert solvent.

8. The process of claim 7 further characterized in that said solvent is selected from the group consisting of pyridine and its homologs.

9. A process for the production of 2-(3,4-dihydroxyphenylamino)-imidazoline hydrochloride which comprises reacting the acetone compound of 4-amino-pyrocatechol with ethylene-isothio-urea-methyl ether hydroiodide at a temperature sufficient to split off methyl mercaptan, separating from the reaction mixture the acetone compound of 2-(3,4-dihydroxyphenyamino)-imidazoline, treating the latter with hydrochloric acid, and recovering 2-(3,4-dihydroxyphenylamino)-imidazoline hydrochloride.

10. A process for the production of 2-(3,4-dihydroxyphenylamino)-imidazoline hydrochloride which comprises reacting the acetone compound of 4-amino-pyrocatechol with a salt of an ethylene-isothio-urea-alkyl ether of the formula

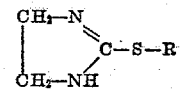

wherein R is a lower alkyl group, at a temperature sufficient to effect splitting off of a mercaptan of the formula R—S—H, separating from the reaction mixture the acetone compound of 2-(3,4-dihydroxyphenylamino)-imidazoline, treating the latter with hydrochloric acid, and recovering 2-(3,4-dihydroxyphenylamino)-imidazoline hydrochloride.

References Cited in the file of this patent

UNITED STATES PATENTS

| Re. 19,569 | Goldberg | May 14, 1935 |
| 1,912,849 | Kranzlein et al. | June 6, 1933 |
| 2,061,557 | Bockmuhl | Nov. 24, 1936 |
| 2,252,721 | Miescher | Aug. 19, 1941 |
| 2,340,425 | Pitkin | Feb. 1, 1944 |
| 2,742,481 | Cain | Apr. 17, 1956 |

FOREIGN PATENTS

| 539,179 | Germany | Nov. 23, 1931 |

OTHER REFERENCES

Krantz et al.: Pharmacologic Principles of Medical Practice, 3rd ed., Williams and Wilkins Co., Baltimore (1954), pp. 668–671.

Hager et al.: J.A.P.A., Scientific Ed., vol. 42, No. 1, January 1953, pp. 36–39.

Scholz: Ind. and Chem. Eng., vol. 37, No. 2, February 1945, pp. 120–125.

Spalton: Mfg. Chemist and Mfg. Perfumer, January 1949, vol. 20, No. 1, pp. 1–9.

Burger: Med. Chem., vol. 1, Interscience Pub., N.Y., 1951, p. 381.